Aug. 22, 1967 W. D. TAYLOR 3,337,108
FRICTIONAL WELDING APPARATUS
Filed Oct. 1, 1964 4 Sheets-Sheet 1
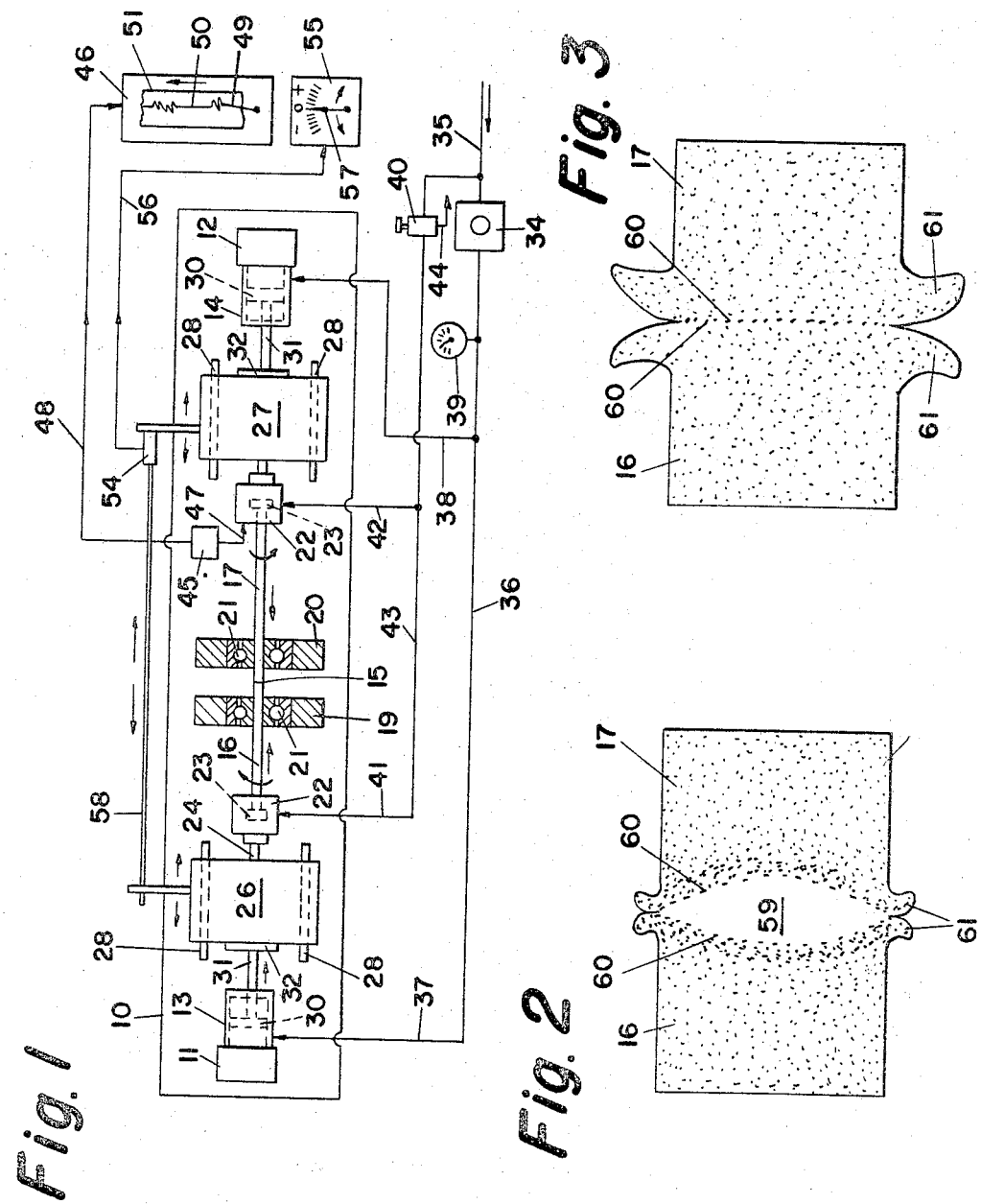
INVENTOR.
WALLACE D. TAYLOR
ATTORNEYS

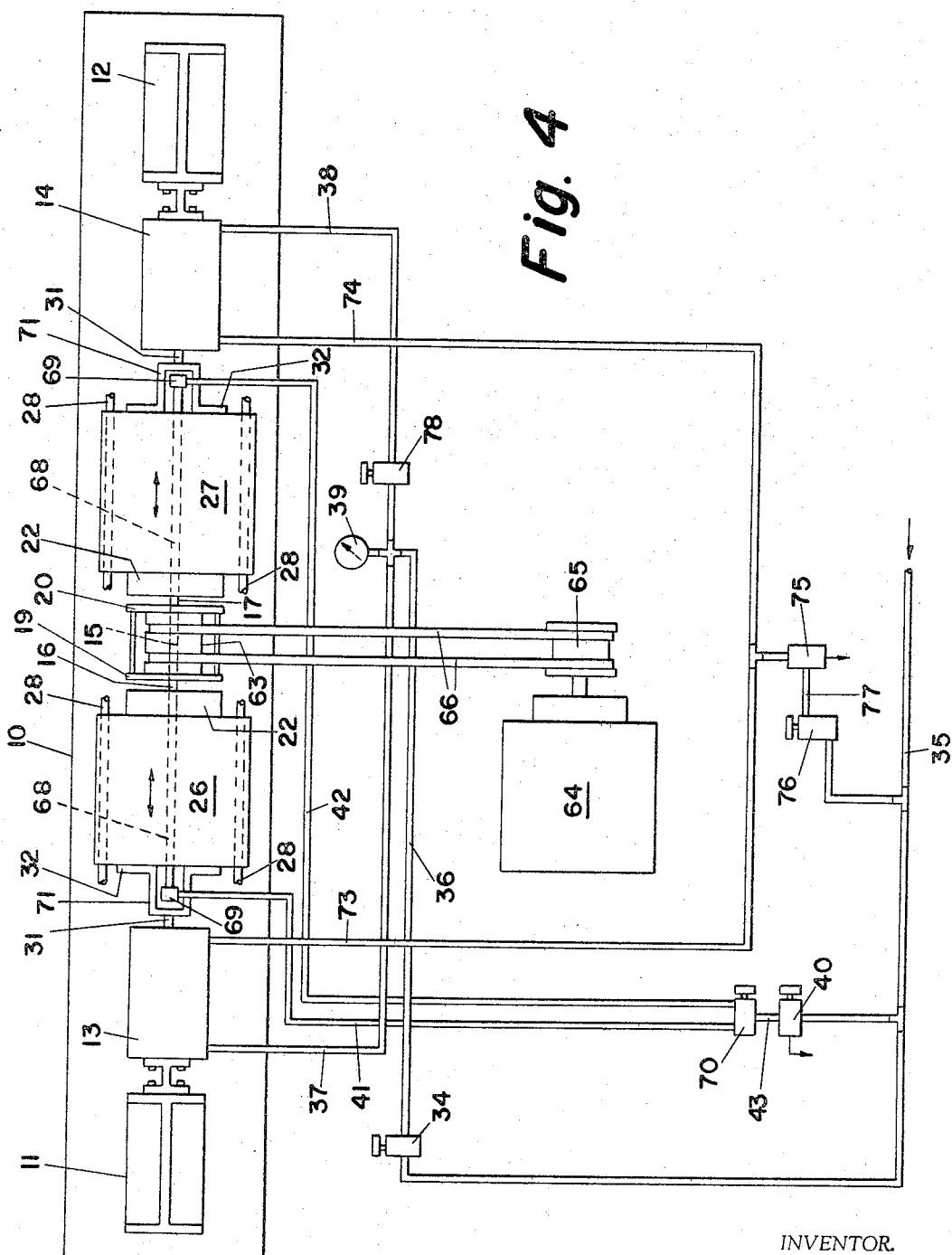

Aug. 22, 1967 W. D. TAYLOR 3,337,108
FRICTIONAL WELDING APPARATUS
Filed Oct. 1, 1964 4 Sheets-Sheet 3

INVENTOR.
WALLACE D. TAYLOR
BY Harry M. Saragovitz
Edward J. Kelly, Herbert Berl
& S. Dubroff
ATTORNEYS

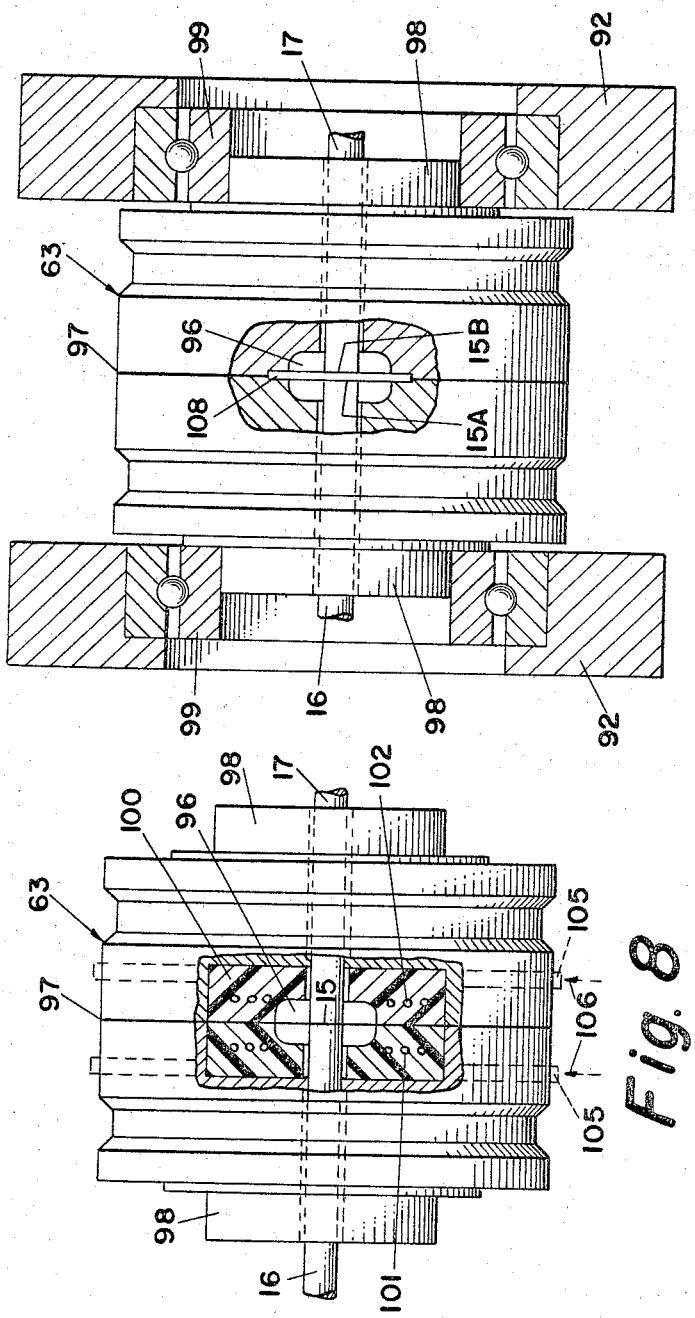

United States Patent Office 3,337,108
Patented Aug. 22, 1967

3,337,108
FRICTIONAL WELDING APPARATUS
Wallace D. Taylor, Wyncote, Pa., assignor to the United States of America as represented by the Secretary of the Army
Filed Oct. 1, 1964, Ser. No. 400,966
12 Claims. (Cl. 228—2)

ABSTRACT OF THE DISCLOSURE

An apparatus comprising a combination of manual, servo-electrical, and pneumatic mechanisms is provided to frictionally weld abutting elements by the application thereto of relatively low welding pressure and driving torque and which is further provided with means for stopping the application of the driving torque without braking the driving means or reducing the weld pressure. In addition, further means are provided to insure the production of a weld interface substantially free of rotational vibration and torque-produced stresses and strains.

---

Figure 5:
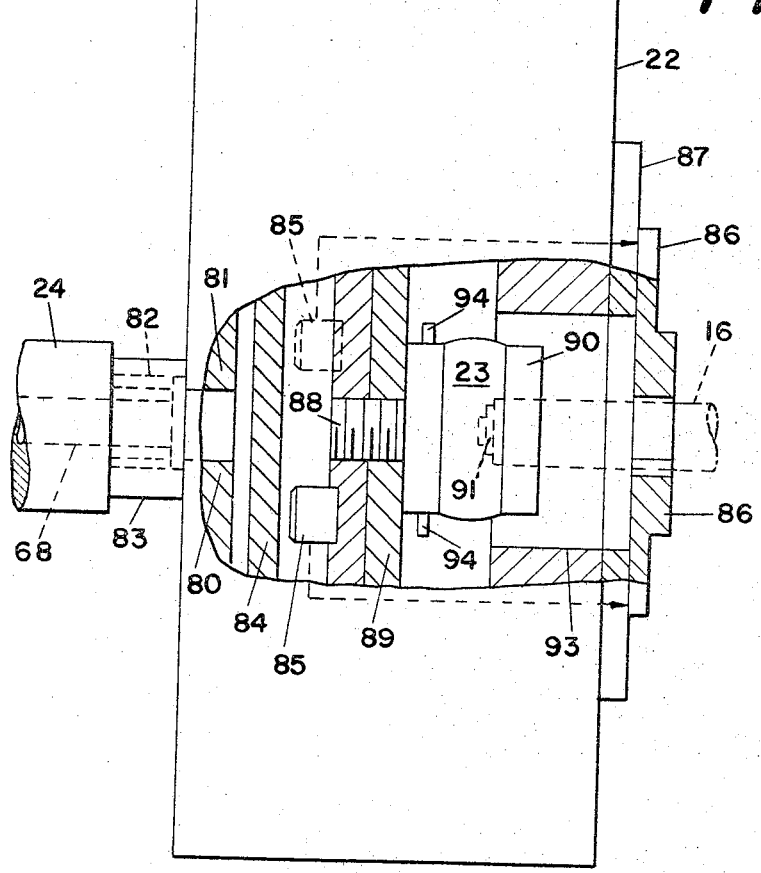

The invention described herein may be manufactured and used by or for the Government for governmental purposes without the payment to me of any royalty thereon.

The present invention relates to friction welding apparatus for rotatable structural elements having flat welding faces or surfaces normal to the respective rotational axes. Such structural elements, which may presently be considered for friction welding in accordance with the invention, are of metals, alloys and other materials, in the form of bars, pipes, cylinders and other structural elements of circular or like cross-section, adapted to be gripped or chucked for applying rotational drive or torque thereto and to be brought into abutting frictional contact in aligned end-to-end relation for welding. The weld interface area or welding zone is thus between the abutting ends which have flat welding end faces or surfaces formed thereon for smooth planar frictional contact normal to the axis or axes of rotation.

In friction welding apparatus of this type, longitudinal pressure and torque are applied to the abutting elements to provide heavy frictional pressure on the interface and rotational movement to generate welding heat and fusion by rotational sliding friction. The heating cycle is complete when the weld zone becomes plastic and/or molten in a thin layer on each surface. Slight extrusion or "flash" may form in a double annular ring as the welding pressure urges or biases the elements to move longitudinally together and upset or expand radially at the molten ends or interface.

With excessively high welding pressures, the extrusion or upset can become undesirably enlarged and is a waste, without gain in weld quality. During the heating or weld-forming stage or cycle, the interface surfaces may also be roughened by the use of such excessive welding pressures, thus requiring heavier torque and power to overcome the added friction, without gain in weld quality. In fact, with heavy extrusion at the interface, the finished weld may be weak at the center where the relative rotational movement is minimum.

It is therefore, an object of this invention, to provide an improved method and means for rotational frictional heat generation in and joining such structural elements by welding at rotational areas of contact with relatively low surface or welding pressure and driving torque.

To accomplish the above object, in accordance with the invention, means are provided for controlling the longitudinal force or welding pressure vs. rotational torque ratios upon the weld interface to obtain a desired high-efficiency sliding-friction heat input to the interface with relatively low longitudinal force or welding pressure.

To control the longitudinal force an indication of its magnitude during the weld or heating cycle or stage is derived from the presence or lack of frictional interface vibrations and their intensity or amplitude as the longitudinal force or welding pressure is applied. The desired relatively low longitudinal force and welding pressure is indicated by the lack of any appreciable interface vibrations, or ones of no appreciable amplitude. These low-amplitude vibrations are of high frequency. The frequency, however, decreases with amplitude increase, indicating the presence of interface rotational impacts of increasing magnitude.

Sliding friction interface vibrations with any appreciable degree of intensity appear to be due to low-frequency high-torque interface rotational impacts. These impacts result from surface roughening due to the use of relatively high longitudinal force or welding pressure to produce high frictional heat. Solid metal-to-metal grain grinding and grabbing, shearing or powdering at the weld surfaces or interface as caused by increasing, and very-high or excessive, longitudinal welding force, inherent in conventional frictional welding operations, are indicated by violent interface vibrations of high intensity or amplitude and low frequency. Excessive torque with consequent waste of driving power is required to break apart the successive localized, partial welds that form, and to renew and continue the sliding friction function of high heat generation necessary to the completion of a sound weld across the entire interface.

Conventional friction welding means of the high-pressure type may thus be considered to use excessively-high welding or interface pressure, characteristic of pressure welds, and low-frequency high-torque frictional heat input to the weld, the low frequency and high torque being due to the high-pressure impacting of the weld interface, as above described. With more effective and lower interface pressures in accordance with the invention, the interfacial shearing and other rotational impacts are reduced substantially to zero and interface vibrations smooth to high frequency with low intensity or amplitudes closely approaching zero as an indication thereof, as the fused interface obtains both the energy and intimate contact for joining the elements. The driving torque is relatively low, and thus, by means in accordance with the invention, it is possible to maintain low welding pressures and obtain consistent high-quality welds with a fraction of the power required using conventional methods and means, and often in a shorter weld time interval for the same type of weld.

The apparatus and method of the present invention may be considered to involve the use of high-frequency low-torque sliding friction heat with the efficiency inherent in heat generation when the interface surfaces are maintained in substantially molecular contact and without appreciable shattering rotational impacts or interface vibrations.

Presently, in conventional friction welding equipment of this type, there is also the problem of stopping the two structural elements from continuing to rotate when the welding or heating cycle is completed with the weld surfaces molten and/or plastic and the weld is forged or solidified, while maintaining or increasing the longitudinal or weld pressure. This involves sharply removing the driving torque from both welding elements, and thus stress and strain at the weld interface as it solidifies. Otherwise the bond, and the strength and quality of the completed weld would be impaired by any torque or driving force tending to rotate or continue the rotation of the welding surfaces and relative movement thereof, which is normally in opposite directions as is understood.

It is present practice to apply instantaneous braking to the driving motors or other torque drive means for each element, to effect abrupt and instant stopping of the interface surfaces at the weld and remove driving torque and stress thereat as the weld is forged and solidifies. Since end pressure must be maintained to at least prevent separation of the weld surfaces by shrinkage as the weld cools, the torque or power driving connections normally are not broken. Thus some torsional stress is inherent and strains within the weld interface may occur which are not conducive to good welds. This occurs during the heavy braking action required to absorb the residual momentum of the rotating driving parts, generally of considerable mass when high power is used. Excessively huge machine are often the result of trying to attain the required short braking cycle by high braking capacity.

It is therefore, a further object of this invention to provide improved rotational frictional welding apparatus and means for stopping the application of exterior driving torque to welding elements of the type referred to, in abutting end-to-end relation for welding, without braking or stopping the driving means or losing the welding pressure and its continued control at the weld interface as the weld forms and solidifies, thereby to attain a higher weld efficiency.

It is also a further and related object of this invention to provide an improved rotational friction welding machine or apparatus wherein the weld interface is substantially free of rotational vibration and wherein the welding elements to be joined may be released from driving torque without torque stress and strains within the weld interface due to conventional brakes and other sources of external force.

To do this the longitudinal or weld pressure is applied to the rear or outer ends of the welding elements through low-friction step or thrust bearings which remain in engagement, while the elements are released from the driving torque and momentum of the driving means, and left free-running thus in forward and rear steady rest elements without torque strains and stresses effective in the friction weld interface as the weld solidifies. Preferably, releasable jaw chucks, in accordance with the invention, provide for gripping and releasing the rear or outer ends of the welding elements and carry the thrust bearings.

Rotational friction welders have spaced driving motor bearings, one at each end, which are subject to slight movement due to vibration and tolerances in construction so that the chucks or driven outer ends of the welding elements may have slight vibrational movement imparted thereto. It will be seen that this movement may be magnified in amplitude at the welding interface or forward ends of the elements, depending upon the distance of overhang thereof from the supporting bearings or chucks.

In attaining a friction weld in accordance with the invention, with relatively low welding pressure and power or torque, it is essential that the planar surface structure of the weld surfaces at the weld interface area be brought to welding temperature without becoming adversely affected by vibratory relative movement. Thus the weld interface must be steady and substantially free of rotational vibration as well as the interface vibrations resulting from welding pressure hereinbefore discussed.

Accordingly, it is a further object of this invention to provide means for holding rotatable structural elements of the type referred to, and applying welding pressure and driving torque thereto for friction welding, whereby the abutting weld surfaces at the interface are maintained steady and substantially free of rotational vibration, thus to further assist in attaining the desired high-heat factor in the sliding friction with effectively molecular contact and high impact energy at relatively low surface or interface pressures. Thus in friction welding apparatus embodying the invention, the welding elements are supported relatively close to the friction weld interface, by steadyrest means to maintain sliding friction efficiency in the said interface. Such means may be individual to each element or combined in a unit.

For example, in friction welding of high-heat metals which oxidize more readily during welding, it is desirable to enclose the weld interface ends of the weldable elements, such as in a small welding chamber. Such enclosure also aids in attaining higher welding temperatures without increasing the weld interface pressure or torque. In addition, weld preheat and/or postheat may be provided by heating coils in the chamber walls in accordance with the invention.

It is also a further object of the invention, therefore, to provide enclosure and additional heating at the weld interface in friction welding apparatus of the type described in a simplified unitary structure combining therein vibrational steady-rest means for the interface ends of the weldable structural elements.

It is a still further object of this invention to provide an improved method and means for joining rotatable structural elements in abutting end-to-end relation by friction welding where such elements have widely different melting points, heat conductivities and other physical dissimilarities such as two dissimilar alloy rods, and direct joining would not obtain a quality weld.

In accordance with the invention, this involves the introduction of a third element such as a welding disc between the weld surfaces to effectively form two interface areas. The disc is of metal or material which is compatible for welding with each of the dissimilar structural elements to be jointed. Furthermore the disc is mounted to be rotated at different speeds about a fixed axis generally at its center, or to be held fixed, to provide surface movement with or against the rotational direction of either element, and thereby attain different degrees of relative movement and welding temperatures as required at the two interface zones.

Steady-rest means for the welding elements close to the weld interface ends are also desirable in connection with this modification to aid in developing and maintaining planar contact between the disc and each of the weld or end faces, and to avoid bending or surface damage at either interface area.

Accordingly, it is also a further object of this invention to provide an improved friction welding apparatus of this type with a steady rest structure wherein a third rotational structural element may be introduced between the welding surfaces of two others having different welding characteristics or degrees of direct welding compatibility, such as widely differing welding temperatures or melting points, and be driven in either direction on the same axis therewith and at different speeds, or held fixed, for frictional heating to different degrees and compatible friction welding therewith.

The invention will further be understood from the following description of certain embodiments thereof, when considered with reference to the accompanying drawings, and its scope is pointed out in the appended claims.

In the drawings:

FIG. 1 is a diagrammatic plan view, with two positions in cross-section, of a system or apparatus for friction welding rotatable structural elements of circular or like cross-section in aligned abutting relation, illustrating one embodiment of the invention, FIGS. 2 and 3 are enlarged sectional views of the actual improved weld structure at a typical weld interface, as provided by apparatus like that of FIG. 1 in accordance with the invention, at two different stages of completion, FIG. 4 is a further plan view, similar to that of FIG. 1, of apparatus for friction welding, showing a modification further in accordance with the invention, and actual constructional elements and pneumatic controls as provided, FIG. 5 is a side view, partly in section, showing the construction, in accordance with the invention, of chuck and thrust bearing means used in the apparatus of FIG. 4.

Figure 6:
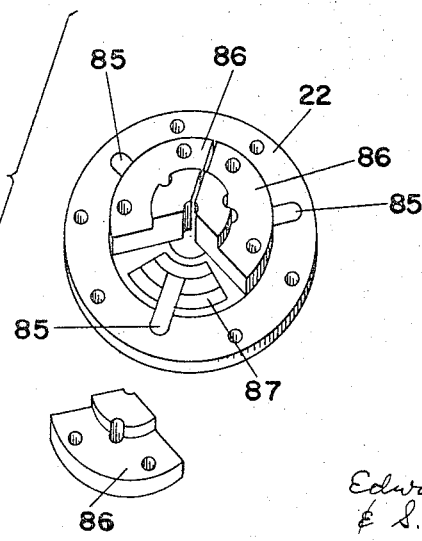

FIG. 6 is a front end or face view, in perspective, of the jaw structure of the chuck and thrust bearing means of FIG. 5, showing further details of construction, and with one element detached to aid in this showing, FIG. 7 is a side view, partly broken away and sectioned, of a rotary steady-rest element of the apparatus of FIG. 4 showing details of construction, in accordance with the invention, for welding dissimilar elements, and FIG. 8 is a similar side view, partly broken away and sectioned, of the rotary steady-rest element of FIG. 7, showing a modification thereof in accordance with the invention.

Referring to the drawings, wherein like reference numerals throughout the several figures designate like elements therein, and referring particularly to FIG. 1, the friction welding apparatus comprises an elongated base or mounting plate 10 having upstanding heavy end frames or brackets 11 and 12 rigidly mounted thereon. These are connected with and support pneumatic or air cylinders 13 and 14, respectively, to provide pressure columns or fixed-abutment means therefor at the ends as the cylinders are operated to apply longitudinal or welding pressure at the weld zone or interface indicated at 15 between two welding specimens or structural elements 16 and 17 which are shown in place for welding by rotational friction in the apparatus.

The welding elements of the present example are elongated metallic or alloy rods of circular cross-section, with compatible melting points for direct welding in this case, and have flat welding faces or surfaces for smooth planar frictional contact at the interface normal to the respective axes of rotation. These axes are the same in the present case with the elements in aligned end-to-end abutting relation as shown.

The opposed inner abutting ends of the structural welding elements 16 and 17 are supported and held in steady alignment, without any effective rotational vibration, by individual rigidly mounted steady rest means 19 and 20, respectively, in relatively close spaced relation to the interface. These may be simple relatively thick parallel plates, as indicated, edge-welded to the base and provided with low-friction central guide bearings 21 for the welding elements which smoothly fit the inner bores thereof without looseness.

The outer or opposite ends of the welding elements 16 and 17 are seated in releasable jaw chucks 22 in abutting contact with free-turning ball or like end thrust bearings 23 therein. The chucks are mounted on the drive shafts 24 of electric driving motors 26 and 27 for the respective welding elements 16 and 17, and the motors are mounted on suitable guide-rails or ways 28 on the base 10 for smooth longitudinal or axial movement as indicated. This movement is imparted to the motors and the connected chucks 22 and welding elements 16 and 17 pneumatically by the air cylinders 13 and 14 through the pistons 30 and piston rod connections 31 with the motor casings as indicated at 32.

This movement is normally toward the weld interface, as indicated by arrowed lines along the axis of rotation, to apply longitudinal or welding pressure to the weld surfaces at the interface. This pressure is maintained relatively low and is varied and controlled by an air control valve 34 connected between a main higher air-pressure supply line or pipe 35 and a low-pressure supply line or pipe 36 having branch lines 37 and 38 to the cylinders. Reversing valves for the cylinders are omitted to simplify the diagram as the forward or pressure-applying connection is normally used and is thus indicated. A pressure gage or like indicating means 39 is provided for setting the desired welding force on the interface.

The chucks 22 are of the normally open or released type and are closed by the application of air pressure through branch lines 41 and 42 and a controlling valve 40 in a common branch line or pipe 43 connected with the supply line 35. The valve 40 is of the two-way type adapted to be tripped closed to cut off the air supply and release the holding pressure through a discharge outlet indicated at 42. This releases the welding elements from driving torque when the weld is formed at the interface, without braking or stopping the rotational driving elements, or losing the welding or longitudinal pressure. This pressure is transmitted through the internal thrust bearings 23 which provide continued contact with the outer ends of the welding elements with the chucks released. Welding pressure and its continued control at the interface is thus provided by the valve 34 as the weld forms and solidifies, and entirely without torque stress and strains within the weld interface.

Due to the individual steady rest means 19 and 20 in close spaced relation to the interface zone, the abutting weld surfaces at the interface are supported and maintained steady and free of harmful rotational vibrations that otherwise would be applied thereto from the driving motors by reason of the extended vibration-multiplying overhang from the chucks and motor bearings. The welding elements, by this improved welder construction, can be maintained in alignment at the interface and instantly released from driving torque and momentum of the driving means, thereby to attain better welds free of rotational stresses and strains common to conventional welding apparatus.

To observe the interface vibrations as an indication of the applied welding pressure and to keep their intensity or amplitude low for more efficient frictional heating at lower pressures, a suitable strain-gage, piezoelectric or like transducer 45 and indicating means 46 may be provided in connection with the apparatus. The transducer means is provided with a sensing contact with the rotating system, as indicated at 47, for picking up interface or longitudinal vibrations at any suitable point. These vibrations are translated into electrical voltage variations and applied to the indicating means 46 through an electrical circuit connection 48. The indicating means may be of the type having a pivoted stylus element 49 which moves in response to the voltage variations received from the transducer means to indicate the fluctuations by a trace 50 in time and amplitude on a moving chart or tape 51. The desired relatively low welding pressures are thus indicated by substantially a straight line trace showing interface vibrations of relatively low or substantially zero amplitude, as hereinbefore described.

Likewise, and only by way of example, measurement of longitudinal expansion and compression or upset at the weld interface as any indication of the weld condition or development, is instrumented through a second electromechanical transducer 54 and electrical indicator 55 connected therewith by the necessary circuits indicated by the line 56. The indicator in the present example is a voltage-responsive meter having a zero-center scale over which the pivoted needle or indicating pointer 57 moves in response to applied negative and positive voltage variations from the transducer 54, which may be of the moving-core electro-magnetic type.

Instrumentation of this type is available commercially on the market. For the present system the instrumentation described is available from the Schaevitz Engineering Co. of Camden, N.J. The second transducer 54 and indicator 55, for example, may be provided in their LVDT indicator system and referred to commercially as their Lineal Variable Differential Transformer System.

The transducer is mounted to respond to the longitudinal relative movement of the weld-pressure applying system controlled by the air cylinders 13 and 14. For convenience of illustration it is shown connected between the relatively movable motors 26 and 27, with the main casing and stator means of the transducer 54 carried by the motor 27 for operation in parallel relation to the axis of movement, and with an operating rod 58 for the core element connected with the motor 26, as indicated.

With the indicator on zero and the weld surfaces in contact for heating and welding, the system provides a negative scale reading as the weld zone heats and the molten films develop to welding condition. By reading this expansion, which is calibrated thousandth of an inch per scale division, for example, the proper condition for welding may be determined, as when the expansion reaches a certain maximum such as six-thousandths for example.

The valve 40 is tripped to release the chucks 22 and instantly free the weld interface of torque stress while the welding pressure is maintained or increased by operation of the control valve 34 to hold the interface against shrinkage or to forge with slight upset. The upset movement of the indicator is thus in the opposite direction as the weld is compressed and solidifies. The indicator moves to zero and through to the positive side where the forging movement is observed and kept to desired limits for minimum extrusion beyond the full fusion of the weld surfaces.

FIG. 2 shows a longitudinal cross-sectional cut through a typical weld made between two bars such as 16 and 17 by welding apparatus of the above type with low weld pressure substantially devoid of interface vibrations. This shows the formed weld 59 between the molten weld surfaces 60 as a homogeneous molten mass which is relatively thick at the center, indicating perfect heating in this low friction area, and therefore assurance of a perfect bond where high pressure welds often fail. To obtain this sample, the weld was permitted to solidify without pressure, this preserving the formed weld without change. It will be noted that there is little or no extrusion or loss of the molten layers, and only slight radial upset at the ends, as indicated.

In FIG. 3 a similar longitudinal cross-sectional cut through a forged, finished and bonded weld of the type shown in FIG. 2 is provided for comparison. It shows the result of increased pressure during the forging cycle to provide perfect fusion and bonding of the abutting ends 60 of the welding elements with only slightly more upset 61 and no extrusion of the molten weld, as is desirable. A finished weld of high quality and strength is thus provided in accordance with the invention.

Referring to FIG. 4, the welding apparatus of FIG. 1 is shown in a constructional form with complete pneumatic or air pressure control connections in place and with modifications of the steady-rest structure for additional operations at the weld interface. The same elements are designated by the same reference numerals and the apparatus is otherwise the same as described in FIG. 1 and operates in the same manner.

In this modification, the steady rest elements 19 and 20 rigidly support the ends of the weld elements 16 and 17 through a center, chambered and rotatable spindle or casing 63 which provides an enclosure for the weld interface. The outer surface is generally cylindrical and grooved for belt drive from a third torque supply or driving motor 64 positioned in axially parallel relation to the welding axis and having a similar grooved driving pulley 65 connected by a double V-belt 66 with the spindle 63. This modified steady rest structure will be further described hereinafter.

Also in this modification, the releasable jaw chucks 22 are operated through axial or central air conduits 68 in the motor shafts on which they are mounted. These are connected through air-tight rotary coupling units 69 at the outer ends with the pressure supply branches 41 and 42. These are connected for control and cutoff by the valve 40 through the line 43 from the supply line 35 as in FIG. 1. However, here a three-way or like selector valve 70 is provided between the line 43 and the branch lines 41 and 42 to selectively connect either one or both lines for operation of one or the other or both jaw chucks together, as may be required in any case.

The coupling units 69 are carried in footed brackets 71 attached to the rear sections 32 of the motor casings centrally or axially thereof and connected with the piston rods 31 of the pressure cylinders 13 and 14. In addition to the forward pressure-applying air supply branches 37 and 38, the retracting pressure-applying connections for the cylinders are shown at 73 and 74, with a common control valve 75 for closing and releasing pressure on the pistons or applying operating pressure to retract the pistons and the connected longitudinally guided and movable motors 26 and 27, chucks 22, and welding elements 16 and 17 when the chucks are energized. Otherwise the welding elements remain in the steady rest structure for withdrawal after welding.

A shut-off or pressure-control valve 76 may be provided in the air supply connection with the main high-pressure supply line 35 indicated by the pipe or supply line 77. In this case the control valve 34 is also of the exhaust type when closed to cut off supply or operating pressure, thereby to permit rearward movement of the pistons in the cylinders 13 and 14. A shut-off valve 78 may be provided in one branch line, as the line 38 for cutting off one pressure cylinder, such as the cylinder 14 when only one welding element is to be rotated and put under pressure against the other which is fixed and stationary. This condition of operation would only be for certain occasions where the full heating efficiency of simultaneous rotation in opposite directions is not required.

The chucks 22 may be of the type shown more fully in FIGS. 5 and 6 to which attention is directed. Each chuck has a central air inlet opening 80 in a back plate or wall 81, which communicates with the air conduit 68 through the shaft 24 on which it is mounted. As shown, the shaft may be shouldered to provide a screw-threaded connection 82 with a central hollow internally threaded hub 83 on the chuck.

A movable pressure plate or piston element 84 is moved by applied operating air pressure against three jaw-operating levers 85 which move radially in the portions which appear in FIG. 6. These extend and are connected as indicated by dash lines each with one of three radially-moveable and interchangeable jaws or jaw elements 86 carried by a connecting fixture 87. The jaws are shaped to grip and cooperatively hold the welding elements 16 and 17 with the latter seated into the chucks, each against the step or thrust bearing 23 as provided.

The bearing 23 may be of the ball bearing type having a fixed outer casing, screw-threaded as indicated at 88, into a seated position firmly against a central partition or wall 89. A rotatable inner element or bearing plate 90 is provided with a stepped central pocket or socket 91 for receiving and centering different size welding elements as indicated. The bearing is inserted and seated through an enlarged central bore or opening 93 in the face plate and chuck casing. This permits the use of a spanner wrench in connection with radial pins 94 to seat or unseat the bearing when changing to different sizes for different welding elements.

With this simplified chuck and thrust bearing consturction it will be seen that the forward or longitudinal thrust and welding pressure may be transmitted from the shaft 24 through the smooth running thrust bearing 23 to the welding element in the chuck, whether the jaws are closed or released. Thus welding pressure can be controlled, that is, maintained constant, increased or decreased as required for the cooling or forging cycle, with the welding elements released from driving torque, and without braking or stopping the rotating drive elements as is conventional, and with sharper and more effective torque cutoff.

Referring now to FIGS. 7 and 8 and the steady rest structure of FIG. 4 more in detail, the center, chambered and rotatable spindle or casing 63, provides an enclosure for the weld interface with a small inner central chamber 96 at the interface. This aids in attaining higher welding temperatures, where needed, without increasing the weld interface pressure or torque. It is also desirable to enclose the weld interface ends of the welding elements if they are of high-heat metals and alloys that oxidize more readily at high temperatures. The chamber also provides for the introduction of inert gases favorable to the reduction of oxidation and other undesirable high-heat effects.

The casing may be divided in a plane normal to the axis of rotation and preferably at the center 97 thru the interface 15 for access to the chamber, and is provided with shouldered hubs 98 for mounting between and rotating in ball-bearings 99 in a pair of steady-rest fixtures 92 which fit into the steady rest posts 19 and 20. The central bore of the casing at each side of the chamber 96 fits the welding elements 16 and 17 smoothly and without looseness, as part of the steady rest structure. Ball-bearings may be used to reduce frictional loading. In any case steady-rest guidance and support are provided relatively close to and on both sides of the interface area.

In the modification of FIG. 8 the interior of the casing surrounding the heating chamber 96 may be provided with a high-heat ceramic lining 100 which also provides insulation for added heating coils 101 and 102 in each half for electric heating current, thereby to provide for weld preheat and/or postheat. This is generally applied before and/or after rotation if required and thus external connections may be fixed. However insulated slip rings, indicated at 105, with fixed sliding contacts 106 may be provided in connection with the coils to permit additional heating while rotating, and also serve to provide heating connections at rest.

The embodiment of FIG. 7 and FIG. 4 provides this improved friction welding apparatus with a steady-rest structure wherein a third rotational structural element such as a welding disc 108 may be introduced between the welding surfaces of two others to join them by frictional welding at effectively two interface areas 15A and 15B. The third element is used when the two others may be of two dissimilar alloys not adapted for direct joining by friction welding, or otherwise have different welding characteristics or degrees of direct welding compatibility, such as widely different welding temperatures or melting points as hereinbefore referred to.

The disc 108 is readily clamped at the chamber 96 between the two sections of the casing 63, as shown, and driven at its radially outer edge portion while in frictional welding contact with and between the welding surfaces at its radially inner or center portion for heating and welding therewith. Because of the separate or third motor drive, the casing 63, and thus the disc, may be driven or rotated in either direction, with or against the rotational direction of either or both welding elements to be joined, at different speeds and on the same axis therewith, or it may be held fixed and stationary. By this relatively simple and effective steady rest structure, different degrees of relative surface movement and frictional heating to different degrees at the interface areas 15A and 15B are readily attained for compatible friction welding of the three elements.

The transversely divided and centrally chambered rotary casing 63 provides enclosure and additional heating and welding means at the weld interface together with vibrational steady-rest means for the interface ends of the weldable structural elements in a simplified unitary structure.

Furthermore, in this improved friction welding apparatus, simple and effective means are provided for holding the welding elements in aligned and opposed rotational position under longitudinal pressure at the interface and applying driving torque thereto to produce the heat of sliding friction and welding without interface vibrations of any appreciable amplitude and thus at maximum efficiency with relatively low driving power and welding pressure at the interface.

Torque removal from the welding elements without braking permits the weld to solidify or forge without torsional stress at the interface. This method of operation is contrary to present and established practice.

Steady rest means close to the interface ends of the welding elements provides for better welds by the elimination of rotational vibration, and thus relative movement, of the surfaces to be joined. Rotation of a third welding element in connection with the steady-rest structure provides for welding elements having different welding characteristics normally not compatible.

I claim:
1. In friction welding apparatus, means for mounting two structural elements in rotational abutting contact at a friction welding interface, means for rotating and applying driving torque to said elements to generate welding heat by rotational surface friction and fusion at said interface, means associated with said driving means for releasably connecting said elements to said driving means, means for actuating said connecting means to directly release said elements from the applied driving torque and momentum of said driving means for substantially torque-free completion of a weld, means in each of said connecting means providing a thrust transmitting connection between the driving means and said elements whether said connecting means are released from or connected to said elements, and means for applying controlled axial pressure to each of said elements and the welding interface through said driving and connecting means independent of the rotation and release of said elements from the driving torque.

2. In friction welding apparatus, means for mounting two structural elements in rotational abutting contact at a friction welding interface and including forward steady-rest bearings for preventing rotational vibration effects at said interface, individual axially movable electric motor means for rotating and applying driving torque to said elements to generate welding heat by rotational surface friction and fusion at said interface, means associated with said driving means for releasably connecting said elements to said driving means, means for actuating said connecting means to directly release said elements from the applied driving torque and momentum of said driving means for torque-free completion of a weld, thrust bearing means in each of said connecting means providing a thrust transmitting connection between the electric motor means and said elements whether said connecting means is released from or connected to said elements and means for applying controlled axial pressure to each of said elements and the welding interface through said driving and connecting means independent of the rotation and release of said elements from the driving torque, said last-named means comprising a movable thrust-transmitting element connected with each associated motor means to provide axial movement thereof and force in the direction of the interface to control the interface pressure.

3. In friction welding apparatus, means for mounting two structural elements in rotational abutting contact at a friction welding interface, means for rotating and applying driving torque to said elements to generate welding heat by rotational surface friction and fusion at said interface, means associated with said driving means for releasably connecting said elements to said driving means, means for actuating said connecting means to directly release said elements from the applied driving torque and momentum of said driving means for substantially torque-free completion of a weld, means in each of said connecting means providing a thrust transmitting connection between the driving means and said elements whether said connecting means are released from or connected to said elements, means for applying controlled axial pressure to each of said elements and the welding interface through said driving and connecting means independent of the rotation and release of said elements from the driving torque, said mounting means comprising a rotational vibration steady rest for each welding element adjacent to the welding interface, and means interposed between said steady-rests for mounting and rotating a third welding element in frictional contact with and between said two structural elements for improved weld quality under conditions of welding compatibility differences between said two elements.

4. In friction welding apparatus, means for mounting two stuctural elements in rotational abutting contact at a friction welding interface, means for rotating and applying driving torque to said elements to generate welding heat by rotational surface friction and fusion at said interface, means associated with said driving means for releasably connecting said elements to said driving means, means for actuating said connecting means to directly release said elements from the applied driving torque and momentum of said driving means for substantially torque-free completion of a weld, means in each of said connecting means providing a thrust transmitting connection between the driving means and said elements whether said connecting means are released from or connected to said elements, means for applying controlled axial pressure to each of said elements and the welding interface through said driving and connecting means independent of the rotation and release of said elements from the driving torque, said mounting means comprising a rotational virbration steady rest for each welding element adjacent to the welding interface, and a chambered casing interposed between said steady rests for enclosing the weld interface for high-temperature welding and the like.

5. In friction welding apparatus, means for mounting two structural elements in rotational abutting contact at a friction welding interface, means for rotating and applying driving torque to said elements to generate welding heat by rotational surface friction and fusion at said interface, means associated with said drivng means for releasably connecting said elements to said driving means, means for actuating said connecting means to directly release said elements from the applied driving torque and momentum of said driving means for substantially torque-free completion of a weld, means in each of said connecting means providing a thrust transmitting connection between the driving means and said elements whether said connecting means are released from or connected to said elements, means for applying controlled axial pressure to each of said elements and the welding interface through said driving and connecting means independent of the rotation and release of said elements from the driving torque, said mounting means comprising rotational bearing means for said welding elements comprising a steady-rest bearing for each welding element in close spaced relation to the interface for preventing rotational vibration effects at the interface.

6. In friction welding apparatus, means for mounting two structural elements in rotational abutting contact at a friction welding interface, means for rotating and applying driving torque to said elements to generate welding heat by rotational surface friction and fusion at said interface, means associated with said driving means for releasably connecting said elements to said driving means, means for actuating said connecting means to directly release said elements from the applied driving torque and momentum of said driving means for substantially torque-free completion of a weld, means in each of said connecting means providing a thrust transmitting connection between the driving means and said elements whether said connecting means are released from or connected to said elements, means for applying controlled axial pressure to each of said elements and the welding interface through said driving and connecting means independent of the rotation and release of said elements from the driving torque, means for sensing and indicating interface axial vibrations in response to variations in applied axial welding pressure as an operational measure thereof, and additional means for sensing and indicating axial weld expansion and compressional or forging movement of the welding elements at the weld interface as an operational measure of the weld formation and bonding.

7. Friction welding apparatus for rotatable structural elements having welding surfaces normal to the respective axes of rotation thereof, comprising in combination, means for mounting and holding said elements aligned in abutting contact at said surfaces, electric motor driving means for applying rotational torque individually to said elements about said axes to generate welding heat and fusion by rotational sliding friction at said surfaces, means for releasably connecting each element from said last-named means and driving torque to permit the fusion to solidify into a firm weld between said elements substantially free of torsional stress at said surfaces, means positioned within said connecting means providing a thrust transmitting connection between said motor driving means and said elements, means connected through said torque applying and connecting means with said elements for applying thereto relatively low controlled axial pressure and a resultant controlled contact pressure at said surfaces for improved welding efficiency, and means for maintaining said controlled contact pressure at said surfaces with said elements released from driving torque.

8. In a friction welding apparatus, the combination of, forward steady-rest bearing means and axial end thrust bearing means for mounting two structural welding elements in rotational abutting contact at a friction welding interface normal to the axis of rotation, individual axially-movable electric motor means connected for rotating and applying driving torque to said elements to generate welding heat by rotational surface friction and fusion at said interface, releasable jaw chuck means in the driving motor connections at each element for directly releasing said elements from applied driving torque and the momentum of said driving means for substantially torque-free completion of a weld, said axial end thrust bearing means being carried by each said chuck means and positioned for seating and applying axial end thrust to said welding elements independently of the jaw chuck operation and release of driving torque, and means for applying controlled longitudinal pressure to said elements and the welding interface through said driving and jaw chuck means, said last-named means comprising a pneumatic cylinder having a fixed abutment mount and a movable thrust element connected with each motor means to provide axial movement thereof and force in the direction of the interface to control the interface contact pressure.

9. In a friction welding apparatus, the combination as defined in claim 8, wherein a motor-driven chambered rotatable spindle is mounted in the steady rest means as part thereof and an enclosure for the weld interface, and wherein said spindle is adapted to receive and hold a third rotational structural welding element between said elements at the interface for welding therewith in compatible relation by rotational surface friction and heating.

10. In a friction welding apparatus, the combination as defined in claim 8, wherein a chambered rotatable casing is mounted in the steady-rest means as part thereof and as an enclosure for the weld interface, and wherein the inner walls of the casing are of heat resistant ceramic material with embedded electric heating coils for applying additional heat to the weld interface in preweld and post-weld operations.

11. In a friction welding apparatus, the combination as defined in claim 8, wherein the jaw-chuck means are provided in direct connection with the motor shafts and are pneumatically operable in response to operating pressure applied through conduit means in said shafts.

12. Friction welding apparatus for rotatable structural elements having welding surfaces normal to the respective axes of rotation thereof, comprising in combination, means for mounting and holding said elements aligned on said axes with said surfaces in abutting contact at a common welding interface, said last-named means including a steady-rest bearing for each of said welding elements relatively close to said interface for reducing rotational vibrations of said surfaces and a low-friction axial thrust bearing having a free-rotating thrust bearing plate adapted for engaging and centering each element axially opposite to said interface, individual axially movable electric motor means having drive shafts positioned for applying rotational driving torque to said welding elements about said axes, releasable jaw-chuck means mounted on each motor shaft for engaging and rotating the respective welding elements on said axes to generate welding heat and resultant plasticity or fusion at the welding interface by rotational sliding friction, said jaw-chuck means providing central internal mounts for said thrust bearings for centering abutting contact with said elements within said chuck means, thereby to release the welding elements directly from the applied driving torque and momentum of the driving motors while maintaining axial contact through said thrust bearings for substantially torque-free bonding and completion of a weld upon release of said chuck means, and pneumatic pressure means connected for applying controlled axial pressure to each of said welding elements and the welding interface through said axially movable motor means and the thrust bearings in the jaw chuck means independently of the rotation by and release of said elements from the driving torque.

References Cited
UNITED STATES PATENTS 3,134,278   5/1964   Hollander et al. _____ 828—2

JOHN F. CAMPBELL, *Primary Examiner.*

M. L. FAIGUS, *Assistant Examiner.*